(12) United States Patent
Lee

(10) Patent No.: US 10,023,064 B2
(45) Date of Patent: Jul. 17, 2018

(54) POWER CAPABILITY ESTIMATION FOR VEHICLE BATTERY SYSTEMS

(71) Applicant: Ford Global Technologies, LLC, Dearborn, MI (US)

(72) Inventor: Tae-Kyung Lee, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 120 days.

(21) Appl. No.: 15/066,044

(22) Filed: Mar. 10, 2016

(65) Prior Publication Data

US 2017/0259684 A1    Sep. 14, 2017

(51) Int. Cl.
*H02J 7/00* (2006.01)
*B60L 11/18* (2006.01)

(52) U.S. Cl.
CPC .............................. *B60L 11/1848* (2013.01)

(58) Field of Classification Search
CPC .................................................. B60L 11/1848
See application file for complete search history.

(56) References Cited

U.S. PATENT DOCUMENTS

| | | | |
|---|---|---|---|
| 7,109,685 B2 | 9/2006 | Tate, Jr. et al. | |
| 7,646,166 B2 * | 1/2010 | Koch | B60L 11/1851 320/104 |
| 7,830,119 B2 | 11/2010 | Naik | |
| 8,008,891 B2 | 8/2011 | Yun et al. | |
| 8,099,180 B2 | 1/2012 | Schoch | |
| 8,935,042 B2 | 1/2015 | Li et al. | |
| 8,935,043 B2 | 1/2015 | Li et al. | |
| 9,071,071 B2 | 6/2015 | Greening et al. | |
| 9,091,735 B2 | 7/2015 | Wang et al. | |
| 9,130,248 B2 | 9/2015 | Laskowsky et al. | |
| 9,132,745 B1 | 9/2015 | Lee | |
| 2009/0259420 A1 | 10/2009 | Greening et al. | |
| 2010/0000809 A1 | 1/2010 | Nishi et al. | |
| 2010/0148731 A1 | 6/2010 | Notten et al. | |
| 2012/0301786 A1 | 11/2012 | Takamuku et al. | |
| 2013/0119921 A1 | 5/2013 | Choe et al. | |
| 2013/0249498 A1 | 9/2013 | Yamamoto et al. | |
| 2014/0072862 A1 | 3/2014 | Saito et al. | |
| 2014/0278167 A1* | 9/2014 | Frost | G01R 31/3624 702/63 |

(Continued)

OTHER PUBLICATIONS

Di Domenico, Domenico, et al., Lithium-Ion Battery State of Charge Estimation With a Kalman Filter Based on an Electrochemical Model, Conference Paper, DOI:10.1109/cca 2008.4629639, Oct. 2008, 7 pages.

(Continued)

*Primary Examiner* — Vuthe Siek
(74) *Attorney, Agent, or Firm* — Brooks Kushman P.C.

(57) ABSTRACT

A controller of a vehicle may be programmed to charge and discharge a battery according to a state of charge derived from model parameters defining one of a series of RC circuits that characterize frequency response of the battery to input current and that each has a time constant proportional to another of the time constants, and a proportionality parameter indicative of proportional relationship between the time constants. The proportionality parameter may be such that a ratio of the resistances of the RC circuits is equal to a ratio of the capacitances of the RC circuits.

16 Claims, 11 Drawing Sheets

(56) References Cited

U.S. PATENT DOCUMENTS

| | | |
|---|---|---|
| 2014/0333317 A1 | 11/2014 | Frost et al. |
| 2014/0350877 A1 | 11/2014 | Chow et al. |
| 2015/0316618 A1 | 11/2015 | Lou et al. |
| 2015/0371788 A1 | 12/2015 | Okada et al. |
| 2016/0028080 A1 | 1/2016 | Sugiura |
| 2016/0052419 A1 | 2/2016 | Takahashi et al. |
| 2016/0164093 A1 | 6/2016 | Inoue et al. |
| 2016/0233545 A1 | 8/2016 | Chen et al. |
| 2017/0040616 A1 | 2/2017 | Lee et al. |
| 2017/0133676 A1 | 5/2017 | Kodato et al. |
| 2017/0214103 A1 | 7/2017 | Onnerud et al. |
| 2017/0222225 A1 | 8/2017 | Kang et al. |

OTHER PUBLICATIONS

Nam, Oanyong, et al., Li-Ion Battery SOC Estimation Method Based on the Reduced Order Extended Kalman Filtering, American Institute of Aeronautics and Astronautics, Korea, Nov. 2007, 9 pages.

Malinowski, Kyle David, State of Charge Estimation for Advanced Batteries: Reduced Order Electrochemical Modeling With Error Compensation, A Thesis submitted to the Graduate Faculty of Auburn University, Auburn, Alabama, Dec. 12, 2011, 156 pages.

* cited by examiner

US 10,023,064 B2

POWER CAPABILITY ESTIMATION FOR VEHICLE BATTERY SYSTEMS

TECHNICAL FIELD

This disclosure relates to power capability estimation for vehicle battery systems.

BACKGROUND

Hybrid-electric and pure electric vehicles rely on a traction battery to provide power for propulsion. The traction battery typically includes a number of battery cells connected in various configurations. To ensure optimal operation of the vehicle, various properties of the traction battery may be monitored. One useful property is the battery state of charge (SOC), which indicates the amount of charge stored in the battery. The SOC may be calculated for the traction battery as a whole and for each of the cells. The SOC of the traction battery provides an indication of the charge remaining. The SOC for each individual cell provides information for balancing the SOC between the cells. In addition to the SOC, battery allowable charging and discharging power limits can be used to determine the range of battery operation and to prevent battery excessive operation.

SUMMARY

A vehicle may include a controller programmed to charge and discharge a battery. The controller may charge and discharge the battery according to a state of charge thereof. The state of charge may be derived from model parameters defining one of a series of RC circuits that characterize frequency response of the battery to input current. Each of the RC circuits may have a time constant that is proportional to another of the time constants. A proportionality parameter indicative of the proportional relationship between the time constants may also support the derivation. The proportionality parameter may be such that a ratio of the resistances of the RC circuits is equal to a ratio of the capacitances of the RC circuits. The series may include no more than two RC circuits.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
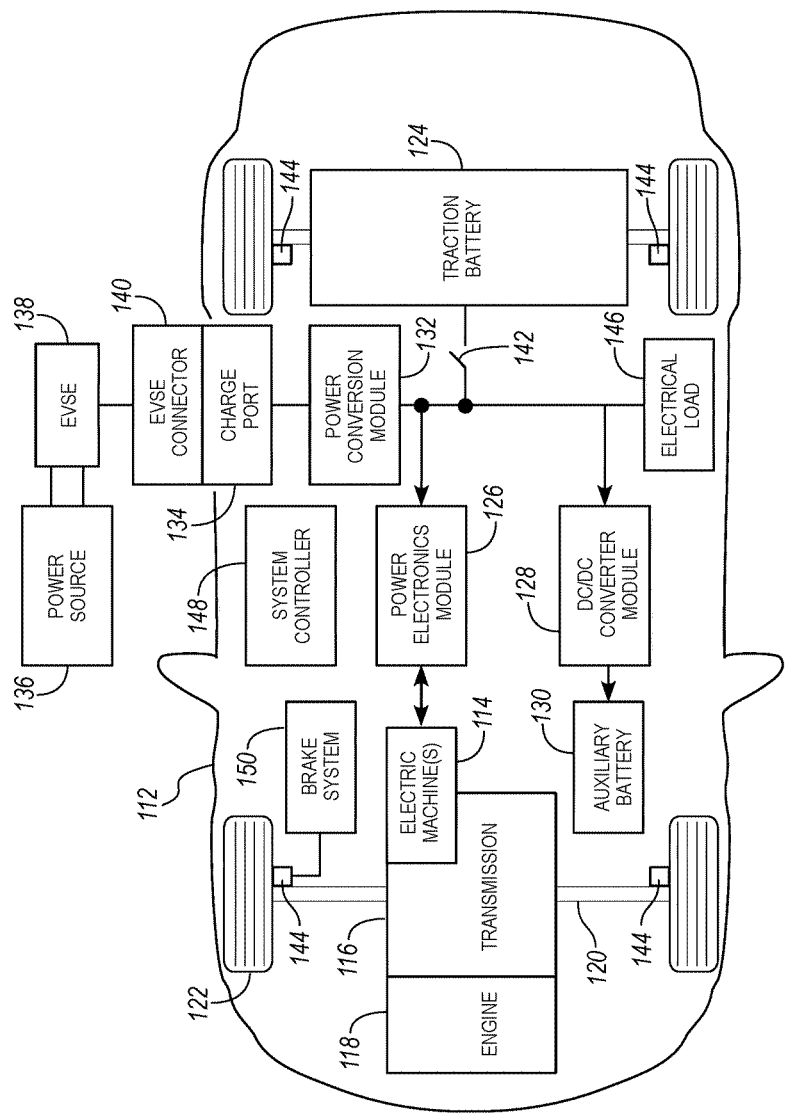
FIG. 1 is a schematic diagram of a vehicle.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed FIG. 1 depicts a typical plug-in hybrid-electric vehicle (HEV). A typical plug-in hybrid-electric vehicle 112 may comprise one or more electric machines 114 coupled to a hybrid transmission 116. The electric machines 114 may be capable of operating as a motor or a generator. In addition, the hybrid transmission 116 is coupled to an engine 118. The hybrid transmission 116 is also coupled to a drive shaft 120 that is coupled to the wheels 122. The electric machines 114 can provide propulsion and deceleration capability when the engine 118 is turned on or off. The electric machines 114 also act as generators and can provide fuel economy benefits by recovering energy that would normally be lost as heat in the friction braking system. The electric machines 114 may also reduce vehicle emissions by allowing the engine 118 to operate at more efficient conditions (engine speeds and loads) and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage DC output. The traction battery 124 is electrically connected to one or more power electronics modules. One or more contactors 142 may isolate the traction battery 124 from other components when opened and connect the traction battery 124 to other components when closed. The power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may use a three-phase AC current to function. The power electronics module 126 may convert the DC voltage to a three-phase AC current used by the electric machines 114. In a regenerative mode, the power electronics module 126 may convert the three-phase AC current from the electric machines 114 acting as generators to the DC voltage used by the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other vehicle loads. Other high-voltage electrical loads 146, such as compressors and electric heaters, may be connected directly to the high-voltage without the use of a DC/DC converter module 128. The electrical loads 146 may have an associated controller that operates the electrical load 146 when appropriate. The low-voltage systems may be electrically connected to an auxiliary battery 130 (e.g., 12V battery).

The vehicle 112 may be an electric vehicle or a plug-in hybrid vehicle in which the traction battery 124 may be recharged by an external power source 136. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 12. The charge port 134 may be any type of port configured to transfer power from the EVSE 138 to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that work cooperatively to operate the wheel brakes 144. For simplicity, the figure depicts one connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 to decelerate or control the vehicle. The brake system 150 may respond to driver commands and may also operate autonomously to implement features such as stability control. The controller of the brake system 150 may implement a method of applying a requested brake force when requested by another controller or sub-function.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components. A traction battery 124 may be constructed from a variety of chemical formulations. Typical battery pack chemistries may be lead acid, nickel-metal hydride (NIMH) or Lithium-Ion.

Figure 2:
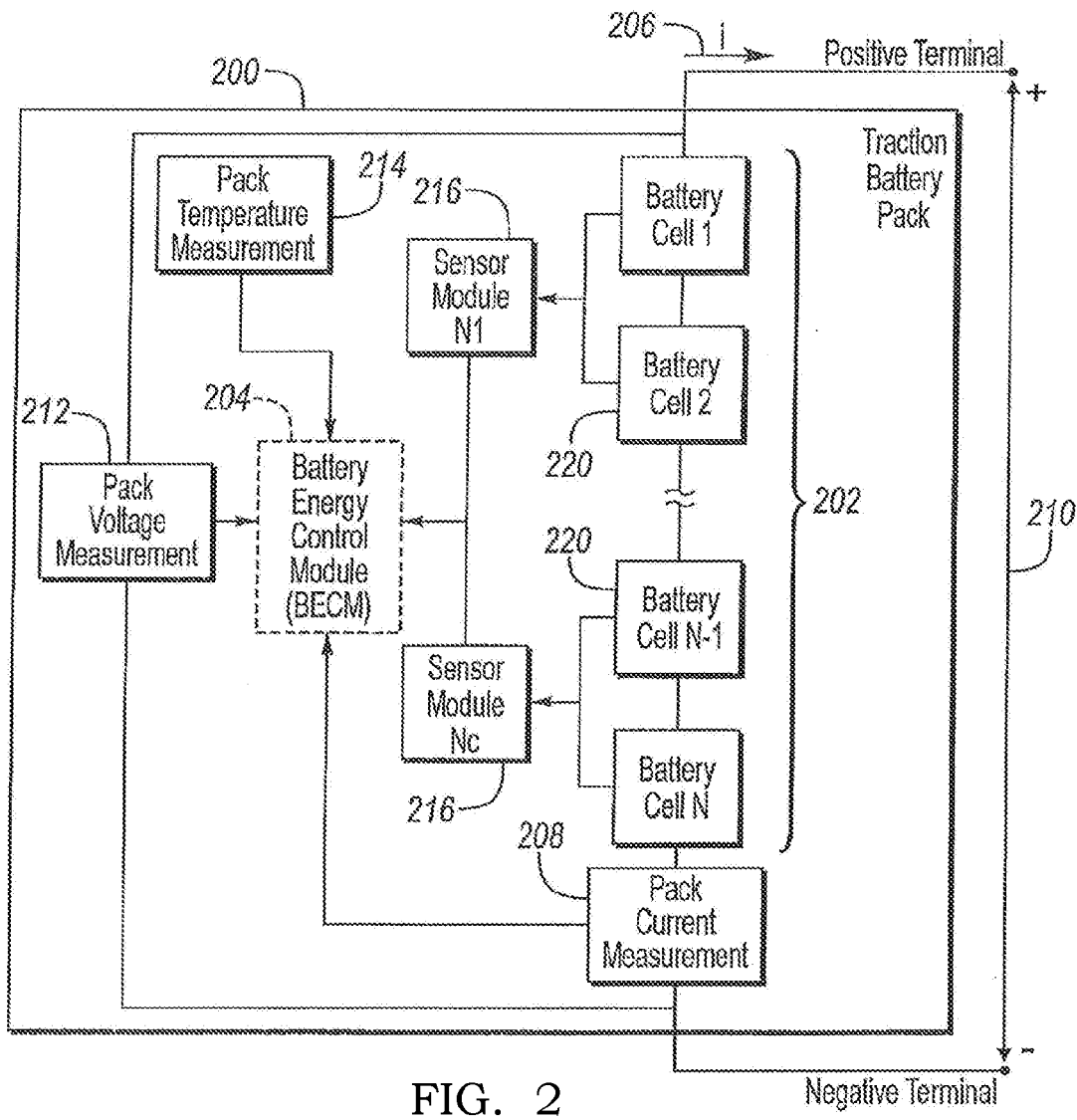
FIG. 2 is a schematic diagram of a battery system.

FIG. 2 shows a typical traction battery pack 200 in a simple series configuration of N battery cells 202. Battery packs 200, may be composed of any number of individual battery cells connected in series or parallel or some combination thereof. A typical system may have a one or more controllers, such as a Battery Energy Control Module (BECM) 204 that monitors and controls the performance of the traction battery 200. The BECM 204 may monitor several battery pack level characteristics such as pack current 206 that may be monitored by a pack current measurement module 208, pack voltage 210 that may be monitored by a pack voltage measurement module 212 and pack temperature that may be monitored by a pack temperature measurement module 214. The BECM 204 may have non-volatile memory such that data may be retained when the BECM 204 is in an off condition. Retained data may be available upon the next ignition cycle. A battery management system may be comprised of the components other than the battery cells and may include the BECM 204, measurement sensors and modules (208, 212, 214), and sensor modules 216. The function of the battery management system may be to operate the traction battery in a safe and efficient manner.

In addition to the pack level characteristics, there may be battery cell 220 level characteristics that are measured and monitored. For example, the voltage, current, and temperature of each cell 220 may be measured. A system may use a sensor module 216 to measure the characteristics of individual battery cells 220. Depending on the capabilities, the sensor module 216 may measure the characteristics of one or multiple of the battery cells 220. The battery pack 200 may utilize up to $N_c$ sensor modules 216 to measure the characteristics of each of the battery cells 220. Each sensor module 216 may transfer the measurements to the BECM 204 for further processing and coordination. The sensor module 216 may transfer signals in analog or digital form to the BECM 204. In some embodiments, the functionality of the sensor module 216 may be incorporated internally to the BECM 204. That is, the sensor module 216 hardware may be integrated as part of the circuitry in the BECM 204 wherein the BECM 204 may handle the processing of raw signals.

The battery cell 200 and pack voltages 210 may be measured using a circuit in the pack voltage measurement module 212. The voltage sensor circuit within the sensor module 216 and pack voltage measurement circuitry 212 may contain various electrical components to scale and sample the voltage signal. The measurement signals may be routed to inputs of an analog-to-digital (A/D) converter within the sensor module 216, the sensor module 216 and BECM 204 for conversion to a digital value. These components may become shorted or opened causing the voltage to be measured improperly. Additionally, these problems may occur intermittently over time and appear in the measured voltage data. The sensor module 216, pack voltage sensor 212 and BECM 204 may contain circuitry to ascertain the status of the voltage measurement components. In addition, a controller within the sensor module 216 or the BECM 204 may perform signal boundary checks based on expected signal operating levels.

Figure 3:
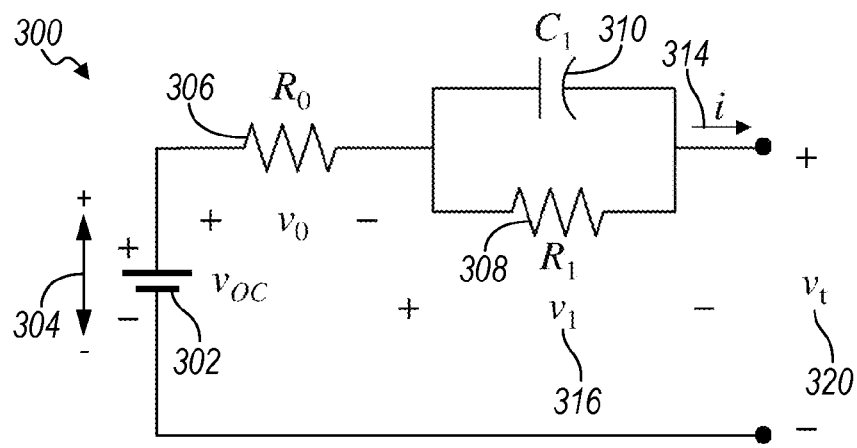
FIG. 3 is a schematic diagram of an equivalent circuit for a battery.

A battery cell may be modeled in a variety of ways. For example, a battery cell may be modeled as an equivalent circuit. FIG. 3 shows one possible battery cell equivalent circuit model (ECM) 300, called as a simplified Randles circuit model. A battery cell may be modeled as a voltage source 302 having an open circuit voltage ($V_{oc}$) 304 having an associated impedance. The impedance may be comprised of one or more resistances (306 and 308) and a capacitance 310. The $V_{oc}$ 304 represents the open-circuit voltage (OCV) of the battery expressed as a function of a battery state of charge (SOC) and temperature. The model may include an internal resistance, $R_0$ 306, a charge transfer resistance, $R_1$ 308, and a double layer capacitance, $C_1$ 310. The voltage $V_1$ 312 is the voltage drop across the internal resistance 306 due to current 314 flowing from the voltage source 302. The voltage $V_2$ 316 is the voltage drop across the parallel combination of $R_1$ 308 and $C_1$ 310 due to current 314 flowing through the parallel combination. The voltage $V_t$ 320 is the voltage across the terminals of the battery (terminal voltage). The parameter values, $R_0$, $R_1$, and $C_1$ may be known or unknown. The value of the parameters may depend on the cell design and the battery chemistry.

Because of the battery cell impedance, the terminal voltage, $V_t$ 320, may not be the same as the open-circuit voltage, $V_{oc}$ 304. As typically only the terminal voltage 320 of the battery cell is accessible for measurement, the open-circuit voltage, $V_{oc}$ 304, may not be readily measurable. When no current 314 is flowing for a sufficiently long period of time, the terminal voltage 320 may be the same as the open-circuit voltage 304, however typically a sufficiently long period of time may be needed to allow the internal dynamics of the battery to reach a steady state. Often, current 314 is flowing in which $V_{oc}$ 304 may not be readily measurable and the value inferred based on the equivalent circuit model 300 may have errors by not capture both fast and slow dynamic properties of the battery. The dynamic properties or dynamics are characterized by a frequency response, which is the quantitative measure of the output spectrum of a system or device (battery, cell, electrode or sub-component) in response to a stimulus (change in current, current profile, or other historical data on battery current). The frequency response may be decomposed into frequency components such as fast responses to a given input and slow responses to the given input. The relative term fast responses and slow responses can be used to describe response times less than a predetermined time (fast) or greater than a predetermined time (slow). To improve battery performance, a model that captures both fast and slow battery cell dynamics is needed. Current battery cell models are complex and are not practical for modern electronic control systems. Here a reduced order battery cell model that is reduced in complexity such that it may be executed on a microcontroller, microprocessor, ASIC, or other control system and captures both fast and slow dynamics of the battery cell is disclosed to increase the performance of the battery system.

Figure 4:
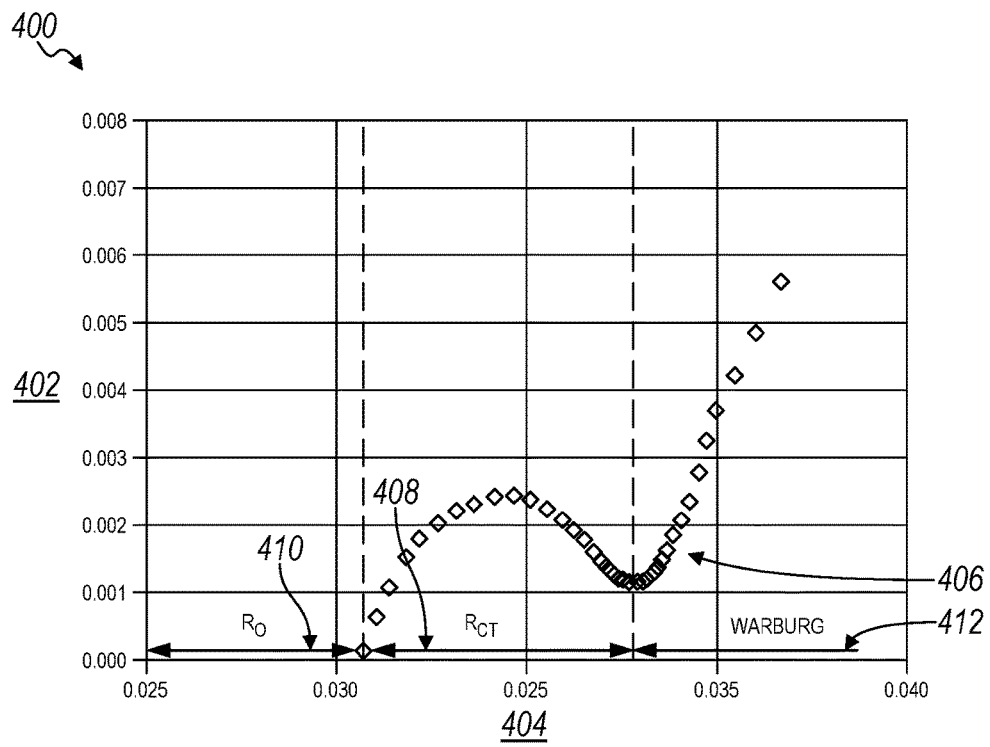
FIG. 4 is a graph representing frequency responses of an equivalent circuit for a battery.

FIG. 4 is a graph 400 illustrating an EIS Nyquist plot of battery impedance with respect to frequency. The EIS Nyquist plot 400 illustrates a direct physical interpretation of the battery system using an equivalent circuit. The EIS Nyquist plot 400 has an x-axis representing real impedance 404 and a y-axis representing imaginary impedance 402. The curve 406 illustrates a measured impedance of the battery over a range of frequency responses. The range of frequency responses of the system may reveal the energy storage and dissipation properties of the battery.

The EIS Nyquist plot 400 may reveal information about the reaction mechanism of an electrochemical process for the battery including different reaction steps that may dominate at certain frequencies, and the frequency response may help to identify the rate limiting steps. The curve 406 may represent the slow battery dynamic response caused by diffusion processes at the solid particle of the electrode active materials and polarization processes across the cell thickness. The instantaneous responses are determined by an internal resistance term $R_0$ 410 of an equivalent circuit model of the battery. Battery dynamics represented by a medium-to-high frequency section 408 mainly determine the power capability with the consideration of battery dynamics. The slow dynamics represented by a low frequency section 412 (e.g., Warburg Impedance Term) and instantaneous dynamics section 410 represented by $R_0$ are modeled as the real-time adjusting internal resistance in the equivalent circuit model. The graph 400 captures the battery dynamic responses that may be used to estimate instantaneous battery power capability of the battery system.

Figure 5:
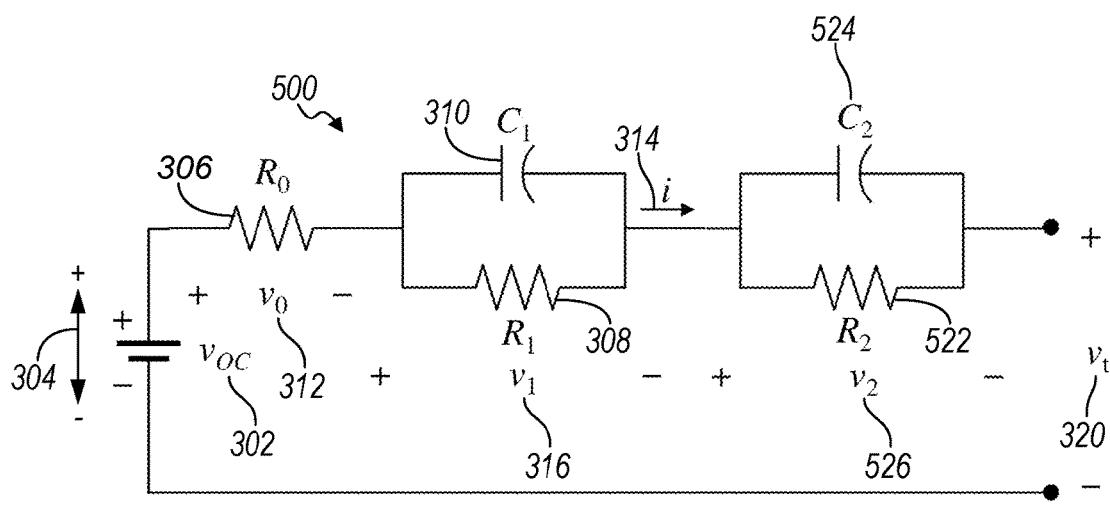
FIG. 5 is a schematic diagram of an equivalent circuit for a battery having two RC circuit sections.

FIG. 5 is a schematic of a simple equivalent circuit model 500 using two RC circuits to model a battery according to an embodiment. The two RC circuits may improve the modeling 500 of the battery pack and/or one or more battery cells by introducing additional dynamics to the model. For instance, the slow dynamics term 412 may be modeled using an additional RC circuit. The RC circuit model may include an additional RC circuit having a resistor $R_2$ 522 and capacitor $C_2$ 524 in parallel and in series with the RC circuit in the equivalent circuit model 300 as shown in FIG. 3. The equivalent circuit model may have other configurations not limited to one or two RC circuits. The equivalent circuit model may include, but is not limited to, two or more RC circuits to model the battery.

For example, the medium-to-fast dynamics are represented by section 408 generated from the RC circuit (i.e., $R_1$ and $C_1$), and the internal resistance is related to $R_0$ 306. The slow dynamics, called a Warburg term 412, are captured by the equivalent circuit model with the additional RC circuit (i.e., $R_2$ and $C_2$). Thus, slow dynamics, herein known as the Warburg term 412, are demonstrated in the equivalent circuit model using two or more RC circuits.

A vehicle battery measurement method may implement the simple equivalent circuit model 500 using two RC circuits to capture fast and slow dynamics independently. The two RC circuits may improve prediction capability for low temperature and/or long continuous charging conditions. The Randles Circuit Model 300 as shown in FIG. 3 may not capture slow battery dynamics related to the Warburg Impedance Terms. Incorporation of Warburg Impedance Terms i in a battery model may require addition computing power or input capacity due to the added terms and parameters required (i.e. $R_2$, $C_2$, $\tau_2$).

The two RC circuit may improve the modeling of the battery dynamics by capturing both low frequency and medium-to-high frequency responses using the following equations:

$$\dot{v}_1 = -\frac{1}{R_1 C_1} v_1 + \frac{1}{C_1} i \quad (1)$$

where $v_1$ 316 is the voltage across the RC circuit which consists of resistance $R_1$ and capacitor $C_1$, the resistance $R_1$ 308 is an active charge transfer resistance, and i 314 is the current exciting the circuit. The RC circuit which consists of resistor $R_1$ and capacitor $C_1$ represents battery dynamic changing during vehicle operation. The RC circuit which consists of resistor $R_2$ and capacitor $C_2$ represents battery slow dynamics (i.e., low frequency) during vehicle operation using the following $$\dot{v}_2 = -\frac{1}{R_2 C_2} v_2 + \frac{1}{C_2} i \quad (2)$$

where $v_2$ 526 is the voltage across the RC circuit which consists of $R_2$ 522 and $C_2$ 524, i 314 is the current exciting in the circuit. The additional RC circuit having resistor $R_2$ 522 and capacitor $C_2$ 524 represents low frequency during vehicle operation. The equivalent circuit model having two RC circuits may allow the calculation of the battery terminal voltage using the following equation:

$$v_t = v_{oc} - v_1 - v_2 - R_0 i \quad (3)$$

where $v_t$ 320 is the terminal voltage, $v_{oc}$ 302 is the battery open circuit voltage determined from SOC, $v_1$ 316 is the voltage across the RC circuit which consists of resistance $R_1$ and capacitor $C_1$, $v_2$ 526 is the voltage across the RC circuit which consists of $R_2$ 522 and $C_2$ 524, and $R_0$ 300 is the internal battery resistance. The voltage across the RC circuits may be calculated using the following equations:

$$v_1 = v_{1,0} e^{-\frac{1}{R_1 C_1} t} + \left(1 - e^{-\frac{1}{R_1 C_1} t}\right) R_1 i \quad (4)$$

$$v_2 = v_{2,0} e^{-\frac{1}{R_2 C_2} t} + \left(1 - e^{-\frac{1}{R_2 C_2} t}\right) R_2 i \quad (5)$$

The battery terminal voltage estimation with multiple RC equivalent circuit models is derived as the following equation:

$$v_t = v_{OC} - v_{1,0} e^{-\frac{1}{R_1 C_1} t} - v_{2,0} e^{-\frac{1}{R_2 C_2} t} - \left(R_0 + \left(1 - e^{-\frac{1}{R_1 C_1} t}\right) R_1 + v_2 \left(1 - e^{-\frac{1}{R_2 C_2} t}\right) R_2\right) i \quad (6)$$

where t is time.

The system may linearize the battery terminal voltage response at current time $t_0$ (e.g., t is equal to zero) to obtain a generalized state feedback structure for estimating the battery current limits as the following equation:

$$v_t = v_t|_{t=0} + \frac{dv_t}{dt}\bigg|_{t=0} t \quad (7)$$

where equation (7) is as followed:

$$\frac{dv_t}{dt}\bigg|_{t=0} = \frac{v_{1,0}}{R_1 C_1} + \frac{v_{2,0}}{R_2 C_2} - \left(\frac{1}{C_1} + \frac{1}{C_2}\right) i \quad (8)$$

where equation (8) represents the voltage change rate, and it is derived by setting t=0 at the following equation:

$$\frac{dv_t}{dt} = \frac{v_{1,0}}{R_1 C_1} e^{-\frac{1}{R_1 C_1} t} + \frac{v_{2,0}}{R_2 C_2} e^{-\frac{1}{R_2 C_2} t} - \left(\frac{1}{C_1} e^{-\frac{1}{R_1 C_1} t} + \frac{1}{C_2} e^{-\frac{1}{R_2 C_2} t}\right) i \quad (9)$$

Figure 7:
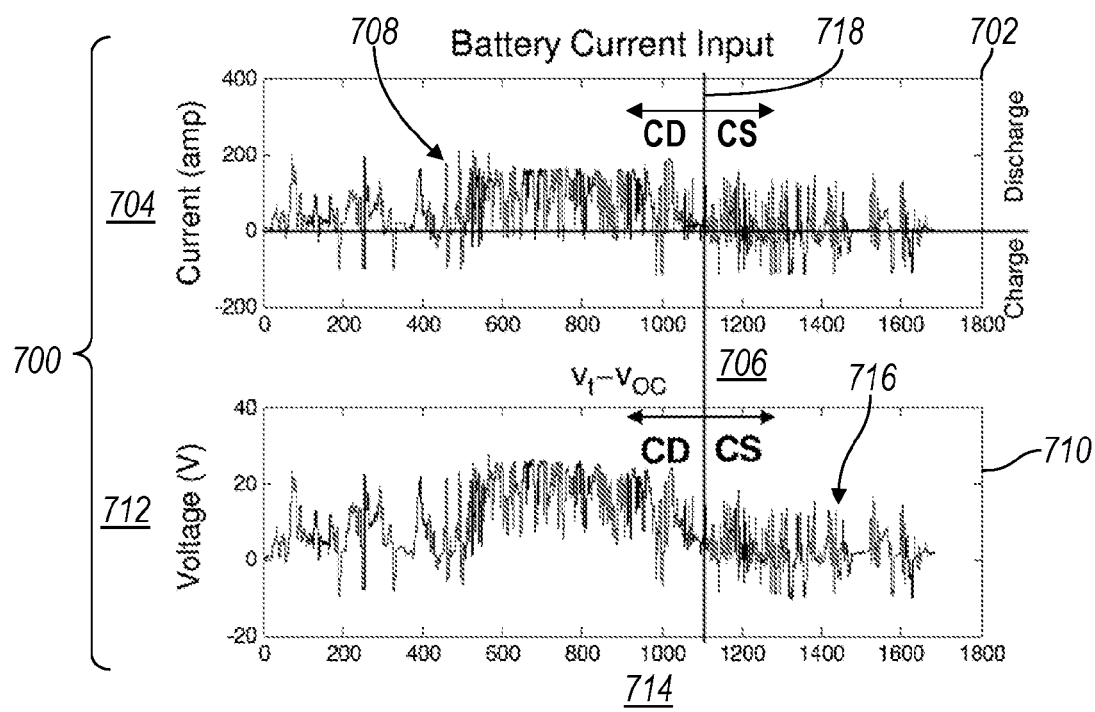
FIG. 7 is a graph depicting battery current inputs and terminal voltage of the equivalent circuit without including the open-circuit voltage of the battery as estimated by SOC.

Determination of $$\frac{dv_t}{dt}$$

for a two RC circuit system, as depicted in FIG. 7 requires calculation of seven parameters (e.g., $v_1$, $v_2$, $R_0$, $R_1$, $R_2$, $C_1$, $C_2$). Calculation of seven parameters requires additional computing power by a controller, when compared to a single RC circuit, to determine the termination voltage $v_t$. The seven parameters may be reduced to five by using intermediate parameters as shown in the following equations:

$$k_1 = R_1/R_0 \quad (10)$$

$$\tau_1 = R_1 C_1 = k_1 R_0 C_1 \quad (11)$$

$$\tau_2 = r^2 \tau_1 = r^2 R_1 C_1 = r R_1 r C_1 = R_2 C_2 \quad (12)$$

$$R_2 = r R_1 \quad (13)$$

$$C_2 = r C_1 \quad (14)$$

Using model parameter r, a proportional relationship may be formed between $R_1$ and $R_2$. The same parameter r, may form a proportional relationship between $C_1$ and $C_2$. The ratio of resistances, r, may be equal to the ratio of capacitances, r. The same proportional relationship may relate the time constant for each of the RC circuits to one another. $\tau_1$ being the time constant for $R_1 C_1$ is related to the time constant, $\tau_2$, for $R_2 C_2$. $\tau_2$ has a quadratic relation to $\tau_1$. The parameter $k_1$ is a quotient of the internal resistance $R_0$ and a resistance term of the charge transfer impedance $R_1$. The parameter $\tau_1$ is a time constant associated with the charge transfer impedance to reduce observed variability of the parameters.

These relationships are formed using assumptions. The assumptions are formed by relating the $R_2$ Warburg Term. Depending on the battery status or conditions, when $R_0$ increases then $R_2$ also increases. Under particular operating conditions, such as when $R_2$ is increased, it is assumed that $R_1$ relatively increases due to the inherent relationship therein. This assumption may reduce the complexity of the voltage equations and reduce the computing power required by substituting r and $\tau_1$ for $\tau_2$ and $R_2$:

$$\dot{v}_1 = -\frac{1}{\tau_1}v_1 + \frac{k_1 R_0}{\tau_1}i \qquad (15)$$

$$\dot{v}_2 = -\frac{1}{\tau_2}v_2 + \frac{R_2}{\tau_2}i \qquad (16)$$

$$\dot{v}_2 = -\frac{1}{r^2\tau_1}v_2 + \frac{k_1 R_0}{r\tau_1}i \qquad (17)$$

where equation (15) represents the change rate of voltage across circuit $R_1C_1$, equation (16) represents the rate of change of voltage across circuit $R_2C_2$. As shown in equation 17, model parameters defining one of a series of RC circuits, $R_1C_1$, may have a time constant that is proportional to another of the time constants, $R_2C_2$. Meaning, the model parameters may characterize frequency response of the battery to input current.

Further, $v_1$ and $v_2$ are the voltage drops across the elements in the circuit as a function of time at time index k representing a dynamic respondent of the circuit. SOC may be used to estimate $v_{oc}$ by using a current integration method or other estimation method. Therefore, the following variables are set at time index k and estimated at k+1 giving:

$$v_{1,k+1} = \left(1 - \frac{\Delta t}{\tau_{1,k}}\right)v_{1,k} + \frac{k_{1,k}R_{0,k}\Delta t}{\tau_{1,k}}i_k \qquad (18)$$

$$v_{2,k+1} = \left(1 - \frac{\Delta t}{r^2\tau_{1,k}}\right)v_{2,k} + \frac{k_{1,k}R_{0,k}\Delta t}{r\tau_{1,k}}i_k \qquad (19)$$

$$\dot{SOC}_{k+1} = SOC_k - \frac{\Delta t}{Q_{batt}}i_k \qquad (20)$$

$$y_k = v_{OC,k} - v_{t,k} = v_{1,k} + v_{2,k} + R_{0,k}i_k \qquad (21)$$

where $y_k$ is the estimated voltage across the RC circuit. The model parameter $R_0$ and introduced model parameters $k_1$ and $\tau_1$ augment the state variable $v_1$ and $v_2$. Therefore, an augmented state vector is shown in the following transposed matrix:

$$X = [v_1 \, v_2 \, R_0 \, k_1 \, \tau_1] \qquad (22)$$

The augmented state vector is not limited to the parameters of battery dynamic response, $v_1$ and $v_2$, and other model parameters characterizing battery dynamics $R_0$, $k_1$, $v_1$, and $\tau_1$ disclosed in equation (8). For example, if an equivalent circuit model includes additional RC circuits and/or the battery model has other forms of battery dynamic representation, the one or more augmented state vector parameters may change.

A new expression of equation (8) using the augmented state vector X is show in the following Jacobian matrix equation, an almost linearized matrix representing the state equations:

$$\begin{bmatrix} v_{1,k+1} \\ v_{2,k+1} \\ R_{0,k+1} \\ k_{1,k+1} \\ \tau_{1,k+1} \end{bmatrix} = F_k \begin{bmatrix} v_1 \\ v_2 \\ R_0 \\ k_1 \\ \tau_1 \end{bmatrix} + \begin{bmatrix} \frac{k_1 R_0}{\tau_1} \\ \frac{k_1 R_0}{r\tau_1} \\ 0 \\ 0 \\ 0 \end{bmatrix} i_k \qquad (23)$$

where $F_k$ is the system matrix to describe system dynamics and model parameter changes.

$$y_k = H_k \begin{bmatrix} v_1 \\ v_2 \\ R_0 \\ k_1 \\ \tau_1 \end{bmatrix} \qquad (24)$$

where $H_k$ is the output matrix for calculating a system response. For example, this output matrix may calculate the battery terminal voltage $v_t$ as the estimated system response in real-time. The system matrix $F_k$, a Jacobean matrix, and the output matrix $H_k$ are expressed in the following equations:

$$F_k = \begin{bmatrix} 1 - \frac{\Delta t}{\tau_{1,k}} & 0 & \frac{k_{1,k}\Delta t}{\tau_{1,k}}i_k & \frac{R_{0,k}\Delta t}{\tau_{1,k}}i_k & \frac{\Delta t}{\tau_{1,k}^2}(V_{1,k} - k_{1/k}R_{0,k}i_k) \\ 0 & 1 - \frac{\Delta t}{r^2\tau_{1,k}} & \frac{k_{1,k}\Delta t}{r\tau_{1,k}}i_k & \frac{R_{0,k}\Delta t}{r\tau_{1,k}}i_k & \frac{\Delta t}{\tau_{1,k}^2}\left(\frac{V_{2,k}}{r^2} - \frac{k_{1,k}R_{0,k}}{r}i_k\right) \\ 0 & 0 & 1 & 0 & 0 \\ 0 & 0 & 0 & 1 & 0 \\ 0 & 0 & 0 & 0 & 1 \end{bmatrix} \qquad (25)$$

$$H_k = [1 \quad 1 \quad i_k \quad 0 \quad 0] \qquad (26)$$

The model parameters are used to predict the voltage response when a constant current (i) is applied during time (t) as shown in the following equations:

$$v_1 = v_{1,0}e^{-\frac{1}{R_1C_1}t} + \left(1 - e^{-\frac{1}{R_1C_1}t}\right)R_1 i \qquad (27)$$

$$v_2 = v_{2,0}e^{-\frac{1}{R_2C_2}t} + \left(1 - e^{-\frac{1}{R_2C_2}t}\right)R_2 i \qquad (28)$$

$$v_t = v_{OC} - v_{1,0}e^{-\frac{1}{R_1C_1}t} - v_{2,0}e^{-\frac{1}{R_2C_2}t} - \qquad (29)$$
$$\left(R_0 + \left(1 - e^{-\frac{1}{R_1C_1}t}\right)R_1 + v_2\left(1 - e^{-\frac{1}{R_2C_2}t}\right)R_2\right)i$$

Battery current limits may be computed by the following equation:

$$i = \frac{v_{OC} - v_{lim} - v_{1,0}e^{-\frac{1}{R_1C_1}t_d} - v_{2,0}e^{-\frac{1}{R_2C_2}t_d}}{\left(R_0 + \left(1 - e^{-\frac{1}{R_1C_1}t_d}\right)R_1 + v_2\left(1 - e^{-\frac{1}{R_2C_2}t_d}\right)R_2\right)} \quad (30)$$

where i and $i_{min}|v_{lim}=v_{max}$ and $i=i_{max}|v_{lim}=v_{min}$ and $t_d$ is the time duration of the estimation as shown in FIGS. 10-13.

Battery charge and discharge power capability $P_{cap}$ may be computed by the following equations or other equations:

$$P_{cap\_ch}(t_d) = |i_{min}|\{v_{max}\} \quad (31)$$

$$P_{cap\_dis}(t_d) = |i_{max}|\{v_{min}\} \quad (32)$$

where $v_{lim}$ in equation (30) is the lower limit voltage of the battery terminal voltage under discharging, and $v_{max}$ in equation (31) is the upper limit voltage of the battery terminal voltage under charging. For example, during a battery discharge event, the battery discharge current limit during the time period $\Delta t_d$ is calculated from equation (30). Using the calculated battery discharge current limit from equation (30), the battery available power is calculated from equation (31) for the discharge event.

The battery model parameters may be calibrated off-line, or estimated in real time. If real-time model parameter estimation is used, an EKF may be used. The EKF for estimating model parameters and state variables is formulated through the following procedure expressed in the following equation:

$$\hat{x}_{k|k-1} = f(\hat{x}_{k-1|k-1}, u_{k-1}) \quad (34)$$

where $\hat{x}_{k-1|k-1}$ is the augmented state vector and $u_{k-1}$ is the input current.

The input current $u_k$ is transmitted to the algorithm at the specific operating point to allow the system to predict the battery parameters at that time variant. The model parameters are used to predict the voltage response when a constant current is applied during a time period. Based on the equations above, and the EKF know variables, the updated filter equation may now predict the next state of the battery power capabilities using the predict covariance equations as followed:

$$F_{k-1} = \frac{\partial f}{\partial x}\bigg|_{\hat{x}_{k-1|k-1}, u_{k-1}} \quad (35)$$

$$P_{k|k} = \text{cov}(x_k - \hat{x}_{k|k}) = E\left((x_k - \hat{x}_{k|k})(x_k - \hat{x}_{k|k})^T\right) \quad (36)$$

$$P_{k|k-1} = \text{cov}(x_k - \hat{x}_{k|k-1}) = E\left((x_k - \hat{x}_{k|k-1})(x_k - \hat{x}_{k|k-1})^T\right) \quad (37)$$

$$P_{k|k-1} = F_{k-1}P_{k-1|k-1}F_{k-1}^T + Q_k \quad (38)$$

The difference between the new measurement value $y_k$ and the predicted value $h(\hat{x}_{k|k-1})$ is computed using the following equation:

$$\tilde{y}_k = y_k - h(\hat{x}_{k|k-1}) \quad (39)$$

The following equation is the intermediate to determine the Kalman gain $K_k$ as expressed in the following equation:

$$S_k = H_k P_{k|k-1} H_k^T + R_k \quad (40)$$

The equation used to determine the Kalman gain $K_k$ is expressed in the following equation:

$$K_k = P_{k|k-1} H_k^T S_k^{-1} \quad (41)$$

where the Kalman gain determines an update state vector $\hat{x}_{k|k}$ from the $K_k\tilde{y}$ as expressed in the following equation:

$$\hat{x}_{k|k} = \hat{x}_{k|k-1} + K_k \tilde{y}_k \quad (42)$$

The covariance of a state estimation error is in the following equation:

$$P_{k|k} = (I - K_k H_k) P_{k|k-1} \quad (43)$$

The model parameters are estimated from equation (23). The improved battery parameter calculation method allows for an enhanced estimation of the battery power capability while enabling the reduction of a safety margin for a battery usage so that the battery hardware may be applied more aggressively in the powertrain system. Based on the improved method, the HEV controls become more flexible, thus resulting in improved powertrain performance and efficiency.

Figure 6:
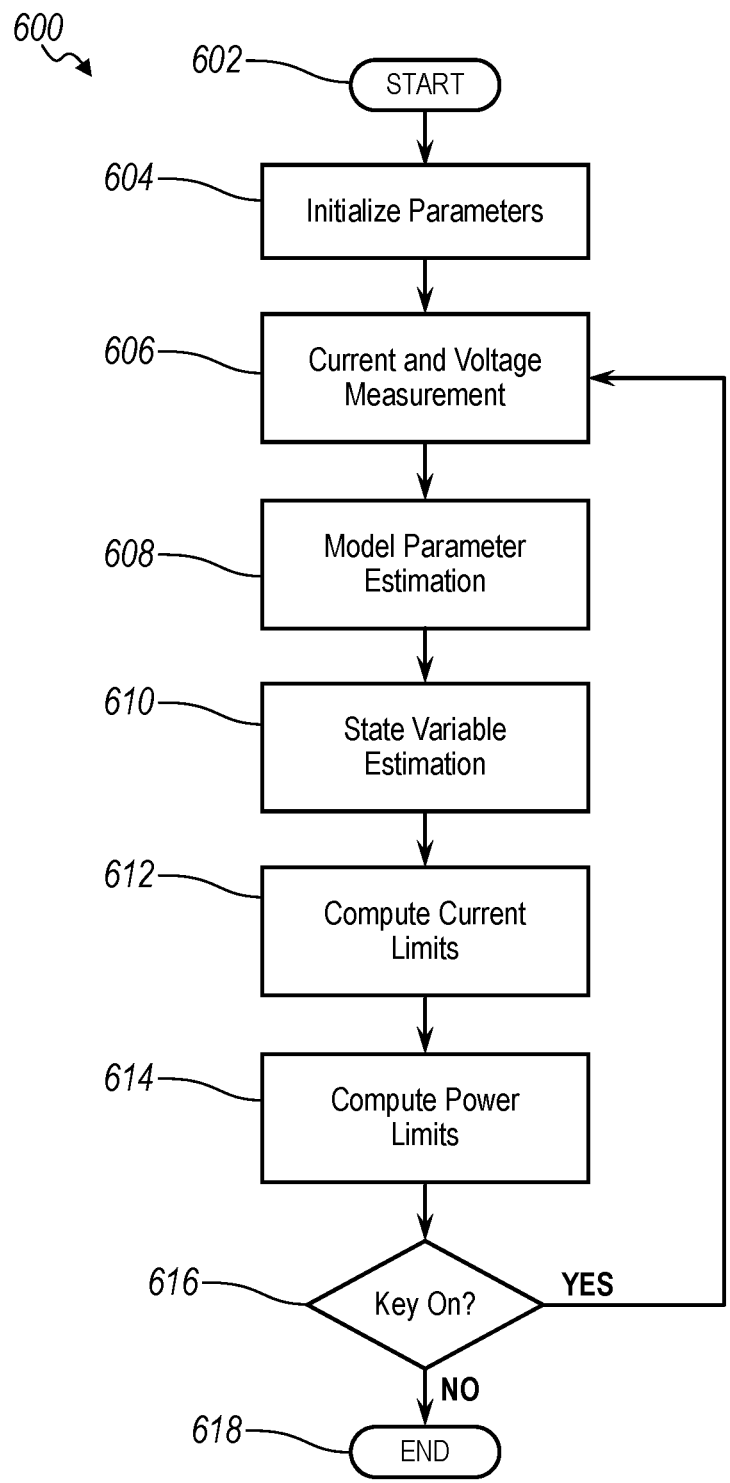
FIG. 6 is an algorithm for estimating model parameters, current limits, and power limits for a battery.

FIG. 6 is a flow chart of an algorithm for identifying one or more battery model parameters used in a battery management method. The method may be implemented using software code contained within the vehicle control module. In other embodiments, the method 600 may be implemented in other vehicle controllers, or distributed amongst multiple vehicle controllers.

Referring again to FIG. 6, the vehicle and its components illustrated in FIG. 1 and FIG. 2 are referenced throughout the discussion of the method to facilitate understanding of various aspects of the present disclosure. The method of controlling the battery parameter prediction in the hybrid electric vehicle may be implemented through a computer algorithm, machine executable code, or software instructions programmed into a suitable programmable logic device (s) of the vehicle, such as the vehicle control module, the hybrid control module, other controller in communication with the vehicle computing system, or a combination thereof. Although the various steps shown in the flowchart diagram 600 appear to occur in a chronological sequence, at least some of the steps may occur in a different order, and some steps may be performed concurrently or not at all.

At step 602, during a key-on event which allows the vehicle to be powered on, the vehicle computing system may begin powering up the one or more modules. The powering up of the one or more modules may cause variables related to the battery management system to initialize before enabling one or more algorithms used to control the battery at step 604.

The initialized parameters may be predetermined values or stored values at the last key off event. Before enabling the algorithms at a key-on event, the parameters should be initialized. For example, the battery management method may initialize several variables including, but not limited to, the battery terminal voltage, current limits, and/or other battery related parameters.

At 606, the system may measure the battery voltage outputs and current inputs using several types of sensors in real time. Once the system has received the battery voltage responses and current measurements, the system may process the received signals to calculate battery state variables, represented by voltage responses based on the fast and slow dynamics of the battery.

The model parameter estimation of fast and slow dynamic voltage responses may be measured using two or more RC circuits in an equivalent circuit mode at step 608. An EKF may be used for model parameter estimation. The model parameter estimation based on the EKF is achieved using equations (34)-(43). Other on-line parameter estimation approaches may be used if model parameters can be identified in real-time. Off-line calibrated model parameter maps can be used if on-line parameter estimation approaches are not used in a battery management system.

At step 610, the system may estimate the state variables. The state variables include the battery open circuit voltage $v_{OC}$ 302, voltage across the RC circuit $v_1$ 316 which consists of the fast dynamics voltage responses, and voltage across the second RC circuit $v_2$ 526 which consists of the slow dynamics voltage responses. The open circuit voltage $v_{OC}$ 302 may be estimated based on the battery state of charge, which may be computed by the current integration or other algorithms.

In another embodiment, step 608 and step 610 may be combined as a single step done by the system. For instance, the estimation process may include battery model parameters and state variables in one estimation structure, so called "parameter state co-estimation". In this embodiment, the different time scales in parameter changes and state chances may cause some deterioration in estimation performance, but the estimation structure may be a simpler model calculated by the system. However, separating the state variable estimation procedure with the estimation of the model parameter may allow the system to improve the estimation accuracy at each state variable and model parameter.

At step 612, the system may compute current limits using the state feedback structure for fast dynamics, slow dynamics, and the battery open circuit voltage as stated in equation (30).

At step 614, the system may calculate power limits using equation (31). The calculated power limits may be used to determine the battery current commands from the battery controller to the battery pack.

At step 616, if the system detects a key-off event, the system may end the one or more algorithms used to manage the battery pack and/or the one or more battery cells. The vehicle computing system may have a vehicle key-off mode to allow the system to store one or more parameters in nonvolatile memory such that these parameters may be used by the system for the next key-on event at step 618.

FIG. 7 are graphs 700 displaying a battery current input profile and a voltage output profile measured in a vehicle or by a battery test. The battery current input graph 702 has an x-axis representing time 706 and a y-axis representing current 704. The current input 708 of the battery pack fluctuates based on vehicle driving modes 718 including the transition between charge depleting (CD) and charge sustaining (CS) driving modes of the system.

The voltage output profile is depicted by the terminal voltage graph 710 having an x-axis representing time 714 and a y-axis representing voltage 712. The terminal voltage is the internal battery voltage 716 of the battery pack and fluctuates based on vehicle driving modes 718 including the transition between charge depleting (CD) and charge sustaining (CS) driving modes of the system.

The battery current input graph and the voltage output graph measured in a vehicle or by a battery test demonstrates the fluctuating of the battery system parameters. The fluctuating parameters may cause inaccurate calculations related to battery performance, hybrid powertrain functionality, and/or other systems being powered by the battery.

Figure 8:
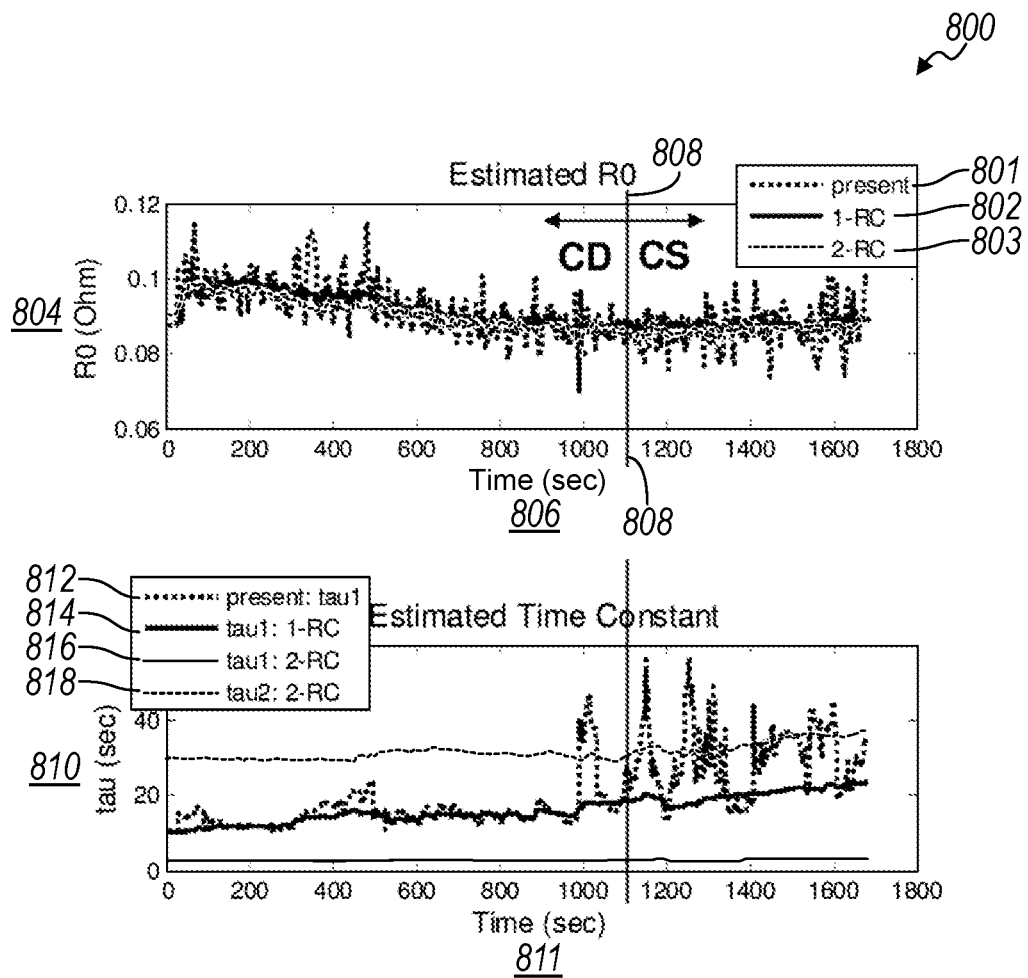
FIG. 8 is a graph depicting the $R_0$ estimation using present methods and equivalent circuit models using Extended Kalman Filters for single RC circuits and double RC circuits.

FIG. 8 is a graph 800 displaying a comparison of calculated battery resistance based on identified battery model parameters. Previous approaches using EKF to measure battery voltage and/or current were implemented in a battery management system; however, the predicted battery parameters tend to show a somewhat fluctuating trajectory. For example, in a hybrid electric vehicle the battery parameters tend to show fluctuating trajectory when the vehicle driving modes are changing between charge depleting and charge sustaining modes 808.

The previous approach of using the EKF to estimate battery parameters in a battery management system tend to be sensitive to internal and external noise caused by the weak observability of the Randle circuit parameters. The Randle circuit parameters using the previous EKF approach has weak electrochemical relationship between each parameter.

For example, the previous estimation of internal resistance $R_0$ 801 of the battery pack and/or cell is shown on the graph 800 in FIG. 8 as weakly observable by a vehicle system or a battery test. The estimation of internal resistance 801 of the battery pack/cell is represented by the graph having an x-axis representing time 806 and a y-axis representing ohms 804. The graph demonstrates the sensitivity to the measurement when the vehicle driving modes are transitioning between battery charge depleting and battery charge sustaining modes 808. The differences between a one RC circuit 802 and two RC circuit are shown.

The $R_0$ 802 estimated by a proposed algorithm using EKF having an underlining system of equations based on one RC circuit with the introduced variables of the battery pack and/or cell is shown on the graph in FIG. 8. The proposed estimation of internal resistance 803 illustrates an improvement to system observability and estimation compared to the previous approach to estimating internal resistance 801, 802. The proposed estimation of internal resistance $R_0$ 803 eliminates the noise by tracking the varying time constant depending on the driving mode changes from CD to CS 808 efficiently. As explained above, by relating the model resistance parameters together and setting the system time constant as an independent variable for the system identification, the parameters may be less sensitive to the noise.

Figure 9:
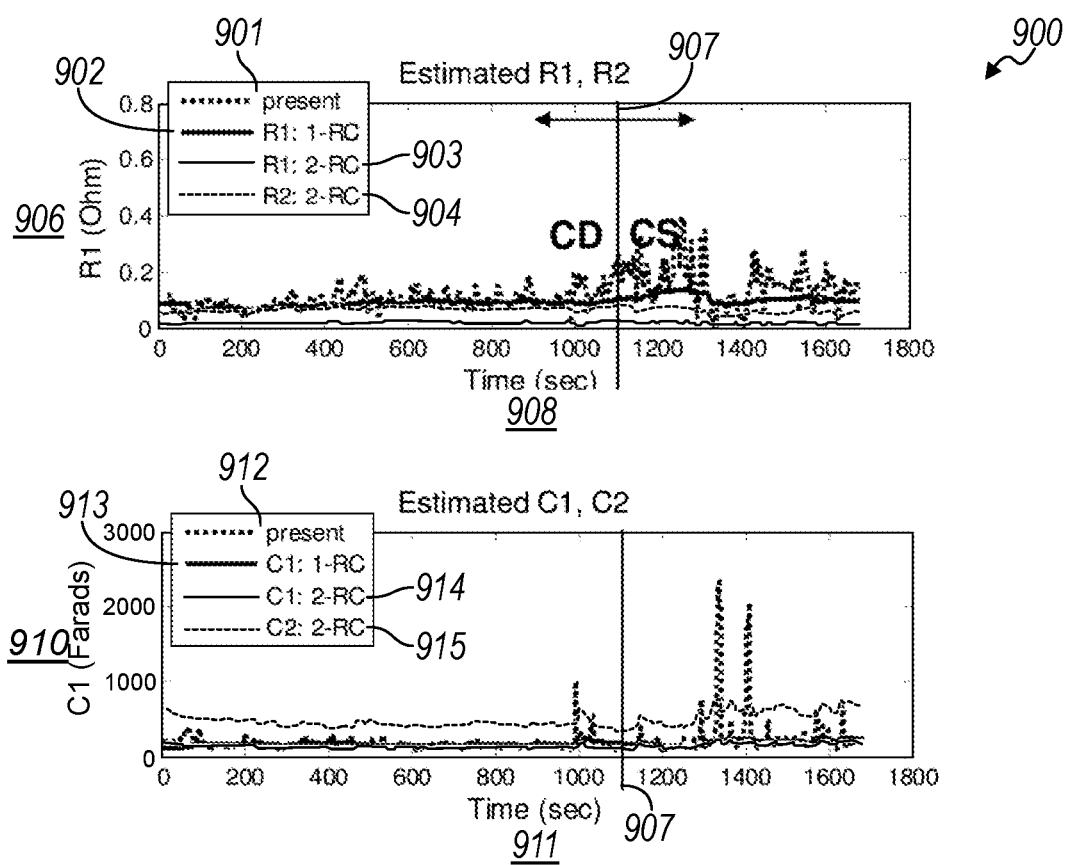
FIG. 9 is a graph depicting the $R_1$, $R_2$, $C_1$, and $C_2$, estimation using present methods and equivalent circuit models using Extended Kalman Filters for single RC circuits and double RC circuits.
Figure 10:
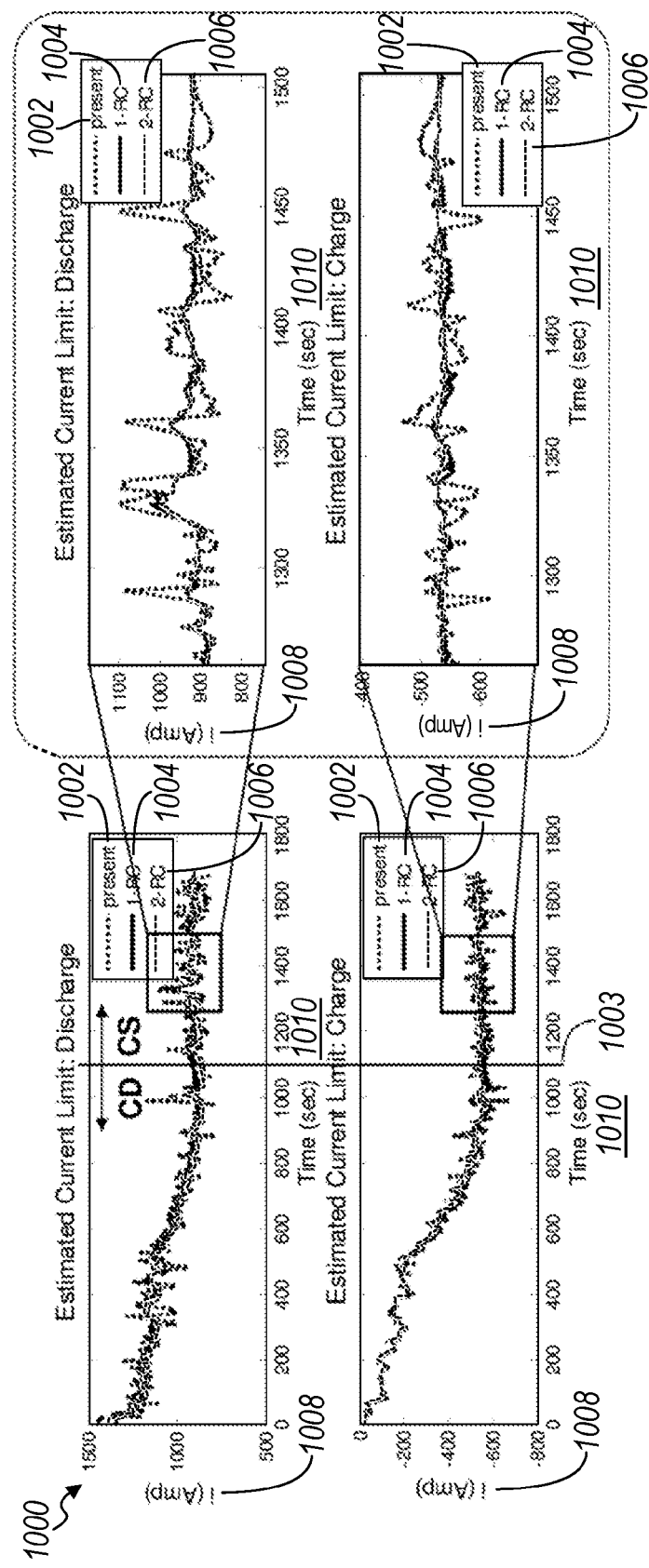
FIG. 10 is a graph depicting current limits for discharge and charge operations lasting one second.

FIG. 9 includes graphs displaying a comparison of the estimated battery model parameters in the RC circuit of the battery equivalent circuit model. The graphs 900 represents a resistance term 906 and capacitance term 910 of the charge transfer impedance, represented by the RC circuit, of the battery management system. The prior estimation values 901, 912 are compared to the proposed estimation values as depicted in the graphs to illustrate the improvement in the observability of the battery parameters 902, 903, 904, 913, 914, 918 using the adjusted EKF method. The medium-to-high frequency battery dynamics The previous estimation of the resistance term of the charge transfer impedance represented by the RC circuit is depicted in the graph having an x-axis representing time 908 and a y-axis representing ohms 906. The previous estimation of the resistance term of the charge transfer impedance $R_1$ 901 in a battery management system fluctuates based on the sensitivity to internal and external noise of the Randal circuit. The estimation of the resistance term of the charge transfer impedance $R_1$ 902 using an EKF with an RC circuit eliminates the noise by relating the model resistance parameters together and setting the system time constant as an independent variable for the system identification. The proposed estimation of the resistance terms of the charge transfer impedance $R_1$ 903 and $R_2$ 904 capture a greater range of battery frequency responses.

For example, under the previous estimation of resistance term of the charge transfer impedance 901, the system would have a fluctuating trajectory when the vehicle driving modes transitions between the CD to CS 907. The two RC circuit having intermediate parameters and boundary conditions is able to adequately dampen the fluctuations and provide an improved estimation. The estimation using the two RC circuit configuration also improves accuracy over the one RC circuit estimation 902. Under the proposed estimation of resistance term of the charge transfer impedance 903, 904 based on the adjusted EKF method, the estimation is improved and has significantly eliminated the sensitivity to the noise in the system.

The capacitance term of the charge transfer impedance by $C_1$ determines battery dynamics changing during vehicle operation. The previous estimation of battery dynamics 912 during vehicle operation is illustrated by fluctuating trajectory in which the x-axis is time 911 and the y-axis is farad 910. The proposed estimation of battery dynamics 914 and 915 is illustrated as a significantly improved measurement calculation of the battery system dynamics as described for resistance above.

FIGS. 10, 11, 12, and 13 depict power and current limit estimations from the previous method estimates, the single RC circuit estimates, and the double RC circuit estimates. Now referring to FIG. 10, the graphs 1000 represent the estimated current limits when the battery is being charged or discharged for one second. Each of the graphs has an y-axis indicating current 1008 over time 1010 on the x-axis. The previous method 1002 is indicated having fluctuating current limit estimations regardless of whether driving mode of the system is charge depleting (CD) and charge sustaining (CS) driving modes of the system 1003. A single RC circuit 1004 estimates current limits using medium-to-high battery frequency responses using an EKF. A two RC circuit 1006 estimates current limits using a wider range of battery frequency responses using an EKF with intermediate parameters. Inclusion of low, medium, and high frequencies in the two RC circuit 1006 estimation may improve the current limit estimation.

Figure 11:
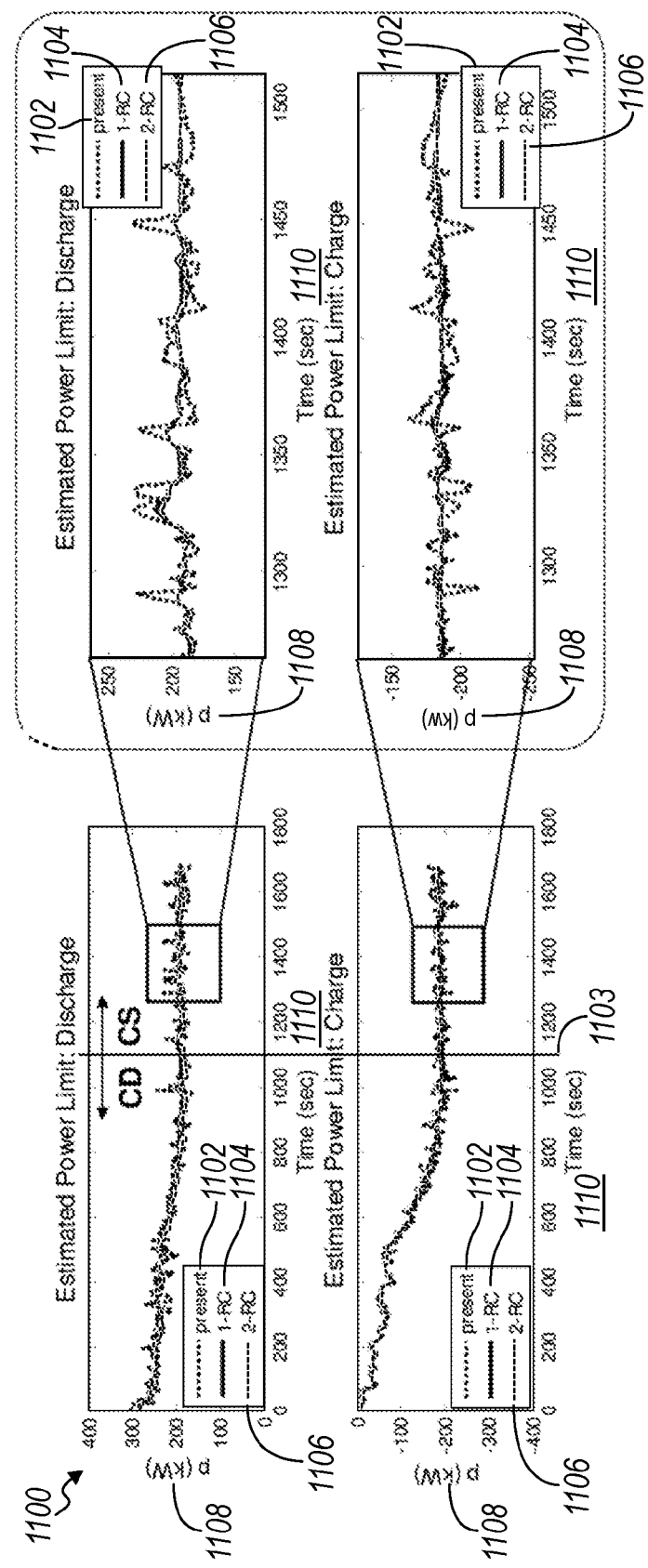
FIG. 11 is a graph depicting power limits for discharge and charge operations lasting one second.

Now referring to FIG. 11, the graphs 1100 represent the estimated power limits when the battery is being charged or discharged for one second. Each of the graphs has an y-axis indicating current 1108 over time 1110 on the x-axis. The previous method 1102 is indicated having fluctuating power limit estimations regardless of whether driving mode of the system is charge depleting (CD) and charge sustaining (CS) driving modes of the system 1103. A single RC circuit 1104 estimates power limits using medium-to-high battery frequency responses using an EKF. A two RC circuit 1106 estimates power limits using a wider range of battery frequency responses using an EKF with intermediate parameters. Inclusion of low, medium, and high frequencies in the two RC circuit 1106 estimation may improve the power limit estimation.

Figure 12:
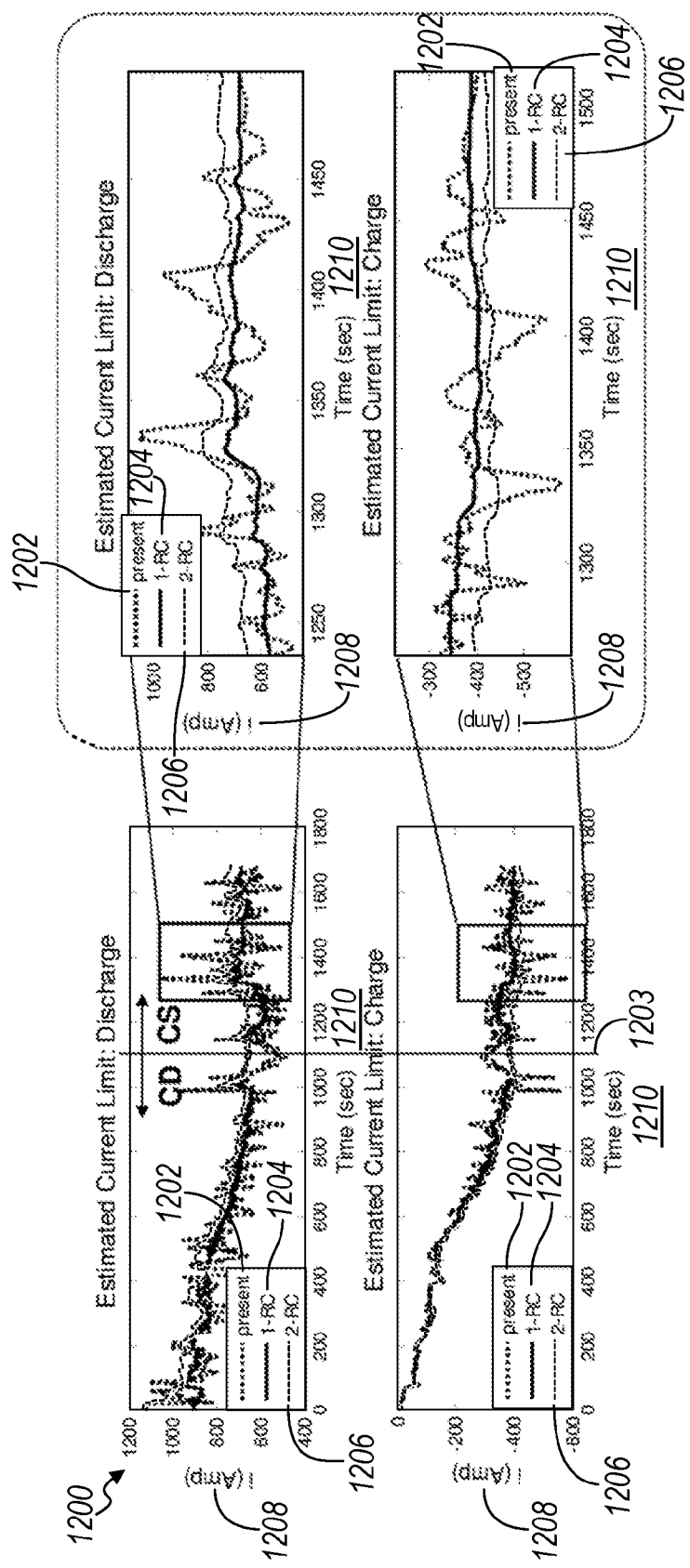
FIG. 12 is a graph depicting current limits for discharge and charge operations lasting ten seconds.

Now referring to FIG. 12, the graphs 1200 represent the estimated current limits when the battery is being charged or discharged for ten seconds. Each of the graphs has a y-axis indicating current 1208 over time 1010 on the x-axis. The previous method 1202 is indicated having fluctuating current limit estimations regardless of whether driving mode of the system is charge depleting (CD) and charge sustaining (CS) driving modes of the system 1203. A single RC circuit 1204 estimates current limits using medium-to-high battery frequency responses using an EKF. A two RC circuit 1206 estimates current limits using a wider range of battery frequency responses using an EKF with intermediate parameters. Inclusion of low, medium, and high frequencies in the two RC circuit 1206 estimation may improve the current limit estimation.

Figure 13:
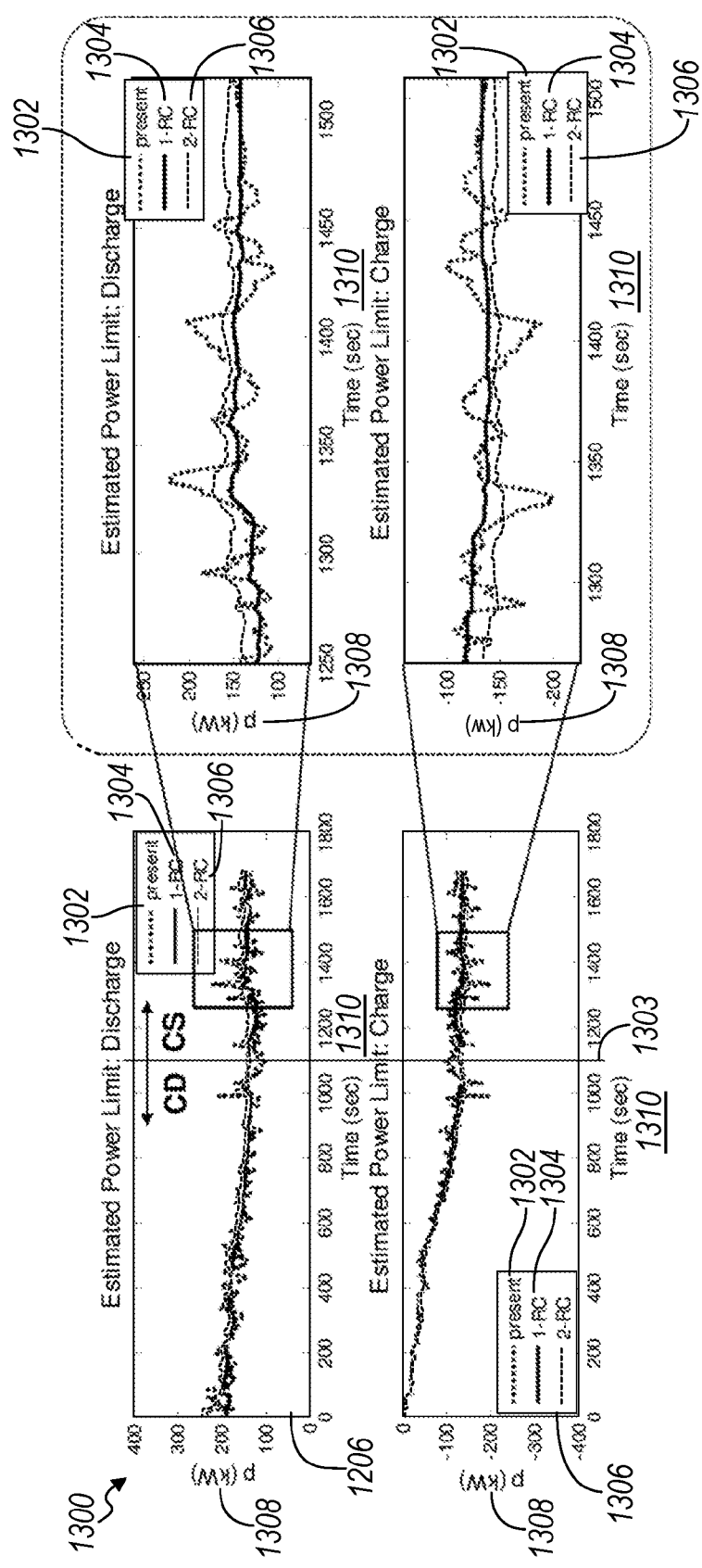
FIG. 13 is a graph depicting power limits for discharge and charge operations lasting ten seconds.

Now referring to FIG. 13, the graphs 1300 represent the estimated power limits when the battery is being charged or discharged for ten seconds. Each of the graphs has an y-axis indicating current 1308 over time 1310 on the x-axis. The previous method 1302 is indicated having fluctuating power limit estimations regardless of whether driving mode of the system is charge depleting (CD) and charge sustaining (CS) driving modes of the system 1303. A single RC circuit 1304 estimates power limits using medium-to-high battery frequency responses using an EKF. A two RC circuit 1306 estimates power limits using a wider range of battery frequency responses using an EKF with intermediate parameters. Inclusion of low, medium, and high frequencies in the two RC circuit 1306 estimation may improve the power limit estimation.

An accurate battery parameter estimation method for the battery management system provides performance, reliability, density in design of battery packs/cells, and/or economy by having smaller battery systems. The accurate battery parameter estimation method may include an adjusted state vector in the EKF method that improves battery control related to operating conditions including, but not limited to, state of charge, power fade, capacity fade, and instantaneous available power. The estimation method of battery parameters may ultimately lengthen the useful lifetime of the battery system.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
 a controller programmed to (1) charge and discharge a battery according to a state of charge derived from (i) model parameters defining one of a series of RC circuits that characterize frequency response of the battery to input current and that each has a time constant proportional to another of the time constants and (ii) a proportionality parameter indicative of proportional relationship between the time constants and (2) estimate the model parameters using an Extended Kalman Filter having a Jacobean matrix including the proportionality parameter.

2. The vehicle of claim 1, wherein the proportionality parameter is such that a ratio of the resistances of the RC circuits is equal to a ratio of the capacitances of the RC circuits.

3. The vehicle of claim 2, wherein the resistance of a second one of the series of RC circuits is proportional to a product of an internal resistance of the battery and proportionality parameter.

4. The vehicle of claim 2, wherein the capacitance of a second one of the series of RC circuits is based on a ratio of a product of the proportionality parameter and time constant of the one of the series of RC circuits to the resistance of the one of the series of RC circuits.

5. The vehicle of claim 1, wherein the series includes no more than two RC circuits.

6. A controller comprising:
input channels configured to receive model parameters defining one of a series of RC circuits that characterize frequency response of a battery to input current and that each has a time constant proportional to another of the time constants, and a proportionality parameter indicative of a proportional relationship between the time constants;
output channels configured to provide current limits for the battery; and
control logic configured to generate the current limits based on the model parameters and proportionality parameter.

7. The controller of claim 6, wherein the proportionality parameter is such that a ratio of the resistances of the RC circuits is equal to a ratio of the capacitances of the RC circuits.

8. The controller of claim 7, wherein the resistance of a second one of the series of RC circuits is proportional to a product of an internal resistance of the battery and proportionality parameter.

9. The controller of claim 7, wherein the capacitance of a second one of the series of RC circuits is based on a ratio of a product of the proportionality parameter and time constant of the one of the series of RC circuits to the resistance of the one of the series of RC circuits.

10. The controller of claim 6, wherein the series includes no more than two RC circuits.

11. The controller of claim 6, wherein the controller is further programmed to estimate the model parameters using an Extended Kalman Filter having a Jacobean matrix including the proportionality parameter.

12. A method comprising:
controlling by a controller a traction battery according to power limits derived from (i) model parameters defining one of a series of RC circuits that characterize frequency response of the battery to input current such that a ratio of resistances of the RC circuits is equal to a ratio of capacitances of the RC circuits and (ii) a proportionality parameter indicative of a proportional relationship between time constants of the RC circuits.

13. The method of claim 12, wherein the resistance of a second one of the series of RC circuits is proportional to a product of an internal resistance of the battery and proportionality parameter.

14. The method of claim 12, wherein the capacitance of a second one of the series of RC circuits is based on ratio of a product of the proportionality parameter and time constant of the one of the series of RC circuits to the resistance of the one of the series of RC circuits.

15. The method of claim 12 further comprising estimating the model parameters using an Extended Kalman Filter having a Jacobean matrix including the proportionality parameter.

16. The method of claim 12, wherein the series includes no more than two RC circuits.

* * * * *